(12) United States Patent
Ohashi et al.

(10) Patent No.: US 11,974,125 B2
(45) Date of Patent: Apr. 30, 2024

(54) CONTROL DEVICE AND CONTROL METHOD

(71) Applicant: KABUSHIKI KAISHA TOKAI RIKA DENKI SEISAKUSHO, Aichi (JP)

(72) Inventors: Yosuke Ohashi, Aichi (JP); Masateru Furuta, Aichi (JP); Yuki Kono, Aichi (JP); Shigenori Nitta, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 469 days.

(21) Appl. No.: 17/240,314

(22) Filed: Apr. 26, 2021

(65) Prior Publication Data

US 2021/0385650 A1 Dec. 9, 2021

(30) Foreign Application Priority Data

Jun. 5, 2020 (JP) ................................ 2020-098255

(51) Int. Cl.
*H04W 12/06* (2021.01)
*G08C 17/02* (2006.01)
*H04W 12/03* (2021.01)
*B60R 25/04* (2013.01)
*B60R 25/24* (2013.01)

(52) U.S. Cl.
CPC ............ *H04W 12/06* (2013.01); *G08C 17/02* (2013.01); *H04W 12/03* (2021.01); *B60R 25/04* (2013.01); *B60R 25/24* (2013.01); *B60R 2325/10* (2013.01)

(58) Field of Classification Search
CPC ...... H04W 12/06; H04W 12/03; G08C 17/02; B60R 25/04; B60R 25/24; B60R 2325/10
See application file for complete search history.

(56) References Cited

U.S. PATENT DOCUMENTS

| 2002/0025823 A1* | 2/2002 | Hara ................ G07C 9/00309 |
| | | 455/456.5 |
| 2009/0132836 A1 | 5/2009 | Mera et al. |
| 2015/0038073 A1* | 2/2015 | Vang ....................... H04W 4/80 |
| | | 455/41.1 |

(Continued)

FOREIGN PATENT DOCUMENTS

| CN | 106537404 A | 3/2017 |
| JP | 2009-124592 | 6/2009 |
| JP | 2019-031871 | 2/2019 |

*Primary Examiner* — Stephen T Gundry
(74) *Attorney, Agent, or Firm* — GREENBLUM & BERNSTEIN, P.L.C.

(57) ABSTRACT

An object of the present invention is to provide a control device and control method that make it possible to perform an inter-device authentication process more certainly and improve security.

Provided is a control device including: a control section configured to control an authentication process of performing a process related to device authentication together with at least one communication device on a basis of information included in a signal received through wireless communication with the communication device. The control section performs control in such a manner that authentication information is changed for each process group in which the authentication process is repeated more than once, the authentication information being information to be used for the authentication process.

14 Claims, 5 Drawing Sheets

(56) References Cited

U.S. PATENT DOCUMENTS

| | | | |
|---|---|---|---|
| 2017/0076524 A1* | 3/2017 | Yoshihara | G07C 9/00309 |
| 2017/0132406 A1 | 5/2017 | Torii | |
| 2019/0051072 A1 | 2/2019 | Okada | |
| 2019/0156606 A1* | 5/2019 | Okada | H04W 4/023 |
| 2019/0256047 A1 | 8/2019 | Iwashita et al. | |
| 2020/0017022 A1* | 1/2020 | Pognon | H04W 4/12 |
| 2020/0084625 A1* | 3/2020 | Kosugi | H04W 12/033 |
| 2020/0107194 A1* | 4/2020 | Ueki | H04Q 9/00 |
| 2020/0128012 A1* | 4/2020 | Iimura | H04L 67/12 |
| 2020/0329031 A1* | 10/2020 | Hashimoto | G06F 21/32 |
| 2020/0363524 A1* | 11/2020 | Yoon | H04W 12/033 |
| 2021/0016743 A1* | 1/2021 | Kusumoto | E05B 81/78 |
| 2021/0181294 A1* | 6/2021 | Kusumoto | H04W 64/006 |
| 2021/0185522 A1* | 6/2021 | Park | H04L 63/0428 |
| 2022/0109561 A1* | 4/2022 | Yang | H04L 9/3215 |
| 2022/0191022 A1* | 6/2022 | Ohashi | H04L 9/16 |
| 2022/0210641 A1* | 6/2022 | Ohashi | H04L 63/0492 |
| 2022/0214701 A1* | 7/2022 | Park | G06F 21/31 |
| 2022/0276372 A1* | 9/2022 | Furuta | H04B 1/71632 |
| 2023/0016580 A1* | 1/2023 | Saiki | G01S 13/38 |
| 2023/0039407 A1* | 2/2023 | Furuta | H04L 5/0048 |
| 2023/0039434 A1* | 2/2023 | Ohashi | G01S 13/08 |
| 2023/0060554 A1* | 3/2023 | Kono | G01S 11/06 |
| 2023/0087699 A1* | 3/2023 | Furuta | H04W 64/00 |
| 2023/0124612 A1* | 4/2023 | Furuta | G06F 21/43 |
| | | | 713/176 |
| 2023/0133362 A1* | 5/2023 | Furuta | B60R 25/245 |
| | | | 342/22 |
| 2023/0138363 A1* | 5/2023 | Ohashi | B60R 25/245 |
| | | | 455/456.1 |

\* cited by examiner

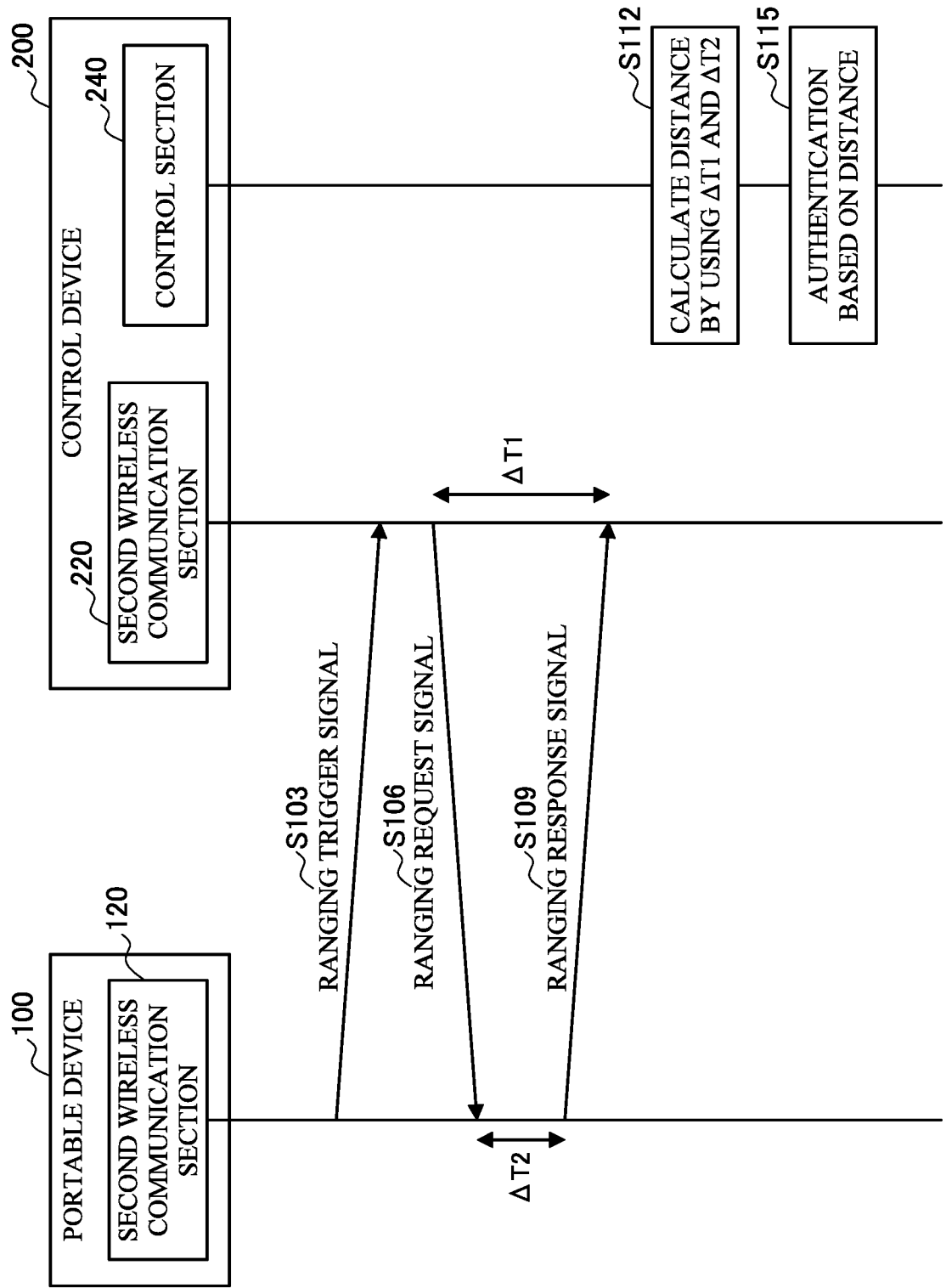

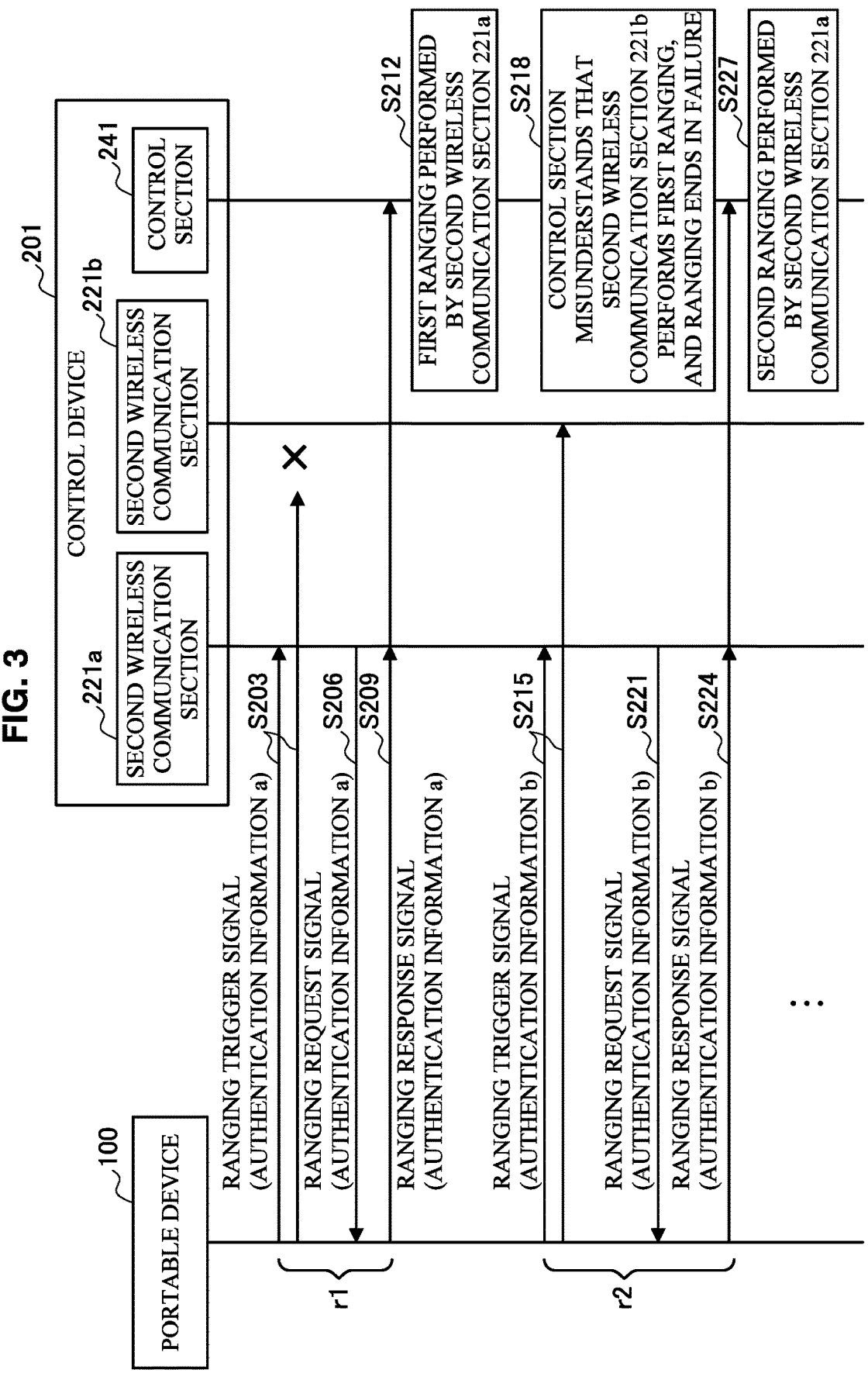

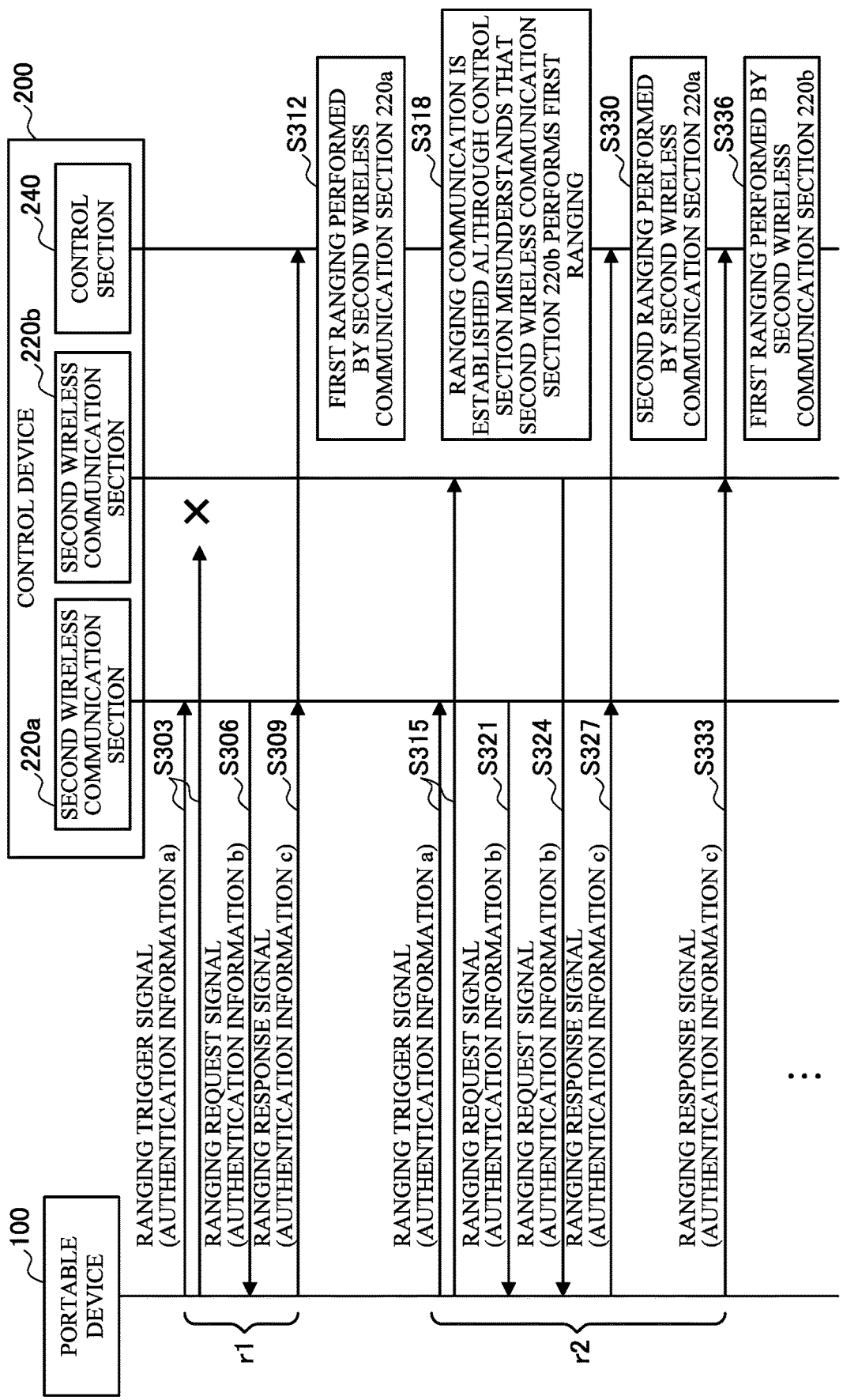

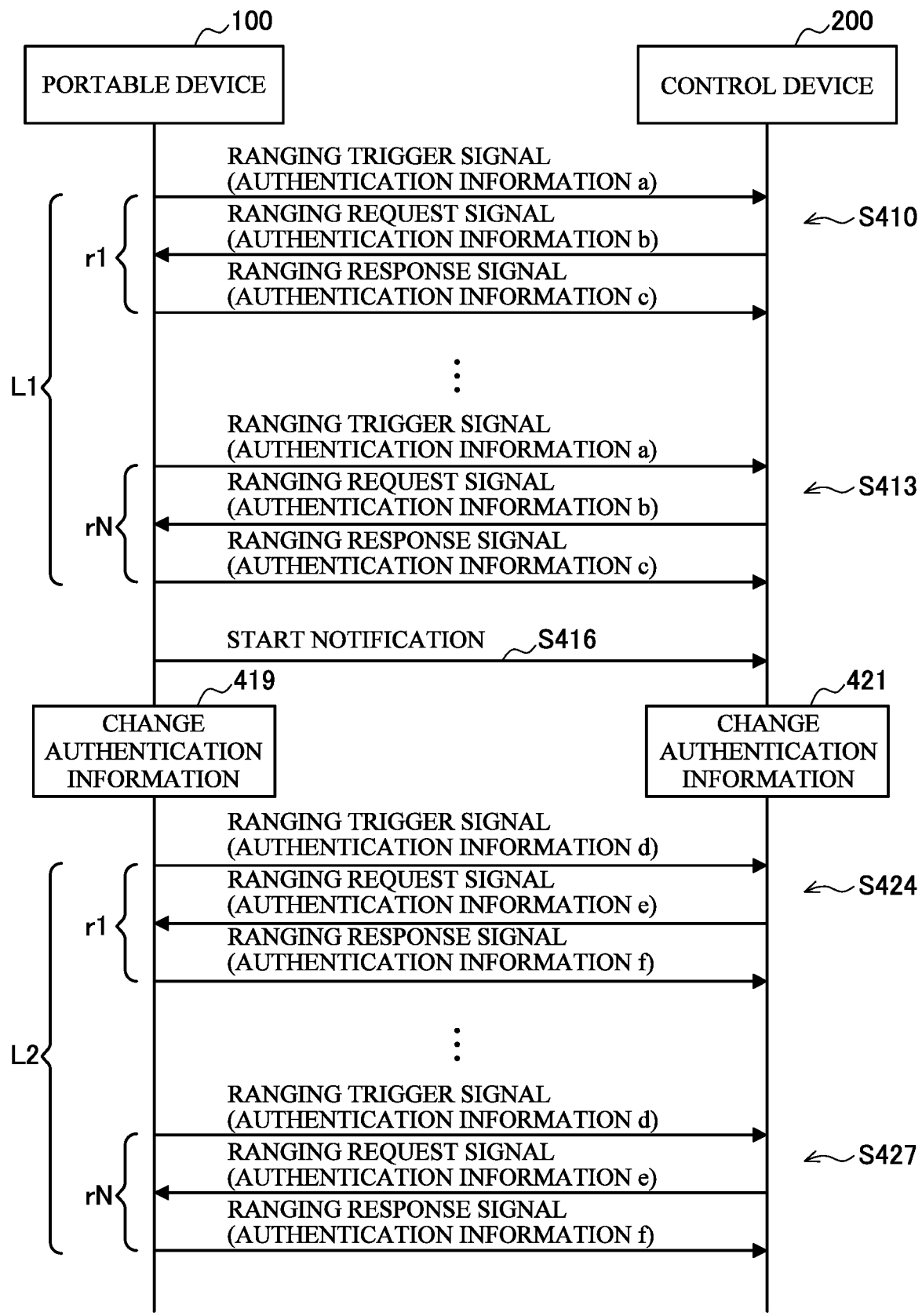

CONTROL DEVICE AND CONTROL METHOD

CROSS REFERENCE TO RELATED APPLICATION(S)

This application is based upon and claims benefit of priority from Japanese Patent Application No. 2020-098255, filed on Jun. 5, 2020, the entire contents of which are incorporated herein by reference.

BACKGROUND

The present invention relates to a control device and a control method.

In recent years, technologies of authenticating a device in accordance with a result of transmitting/receiving signals between devices have been developed. For example, JP 2019-31871A discloses a technology of authenticating a portable device by transmitting/receiving signals between a vehicle-mounted device and the portable device. The portable device is a remote control for locking or unlocking a vehicle. Such a portable device is also referred to as a smart key. In addition the portable device is carried by a driver. In addition to the authentication performed by a first communication unit, JP 2019-31871A also discloses a smart key system that uses a second communication unit to cause the vehicle-mounted device to measure a distance to the portable device and determines whether or not to permit a vehicle operation.

SUMMARY

However, in view of more certain authentication, it is desirable to repeat the authentication process more than once. On the other hand, it is also important to assure security.

Accordingly, the present invention is made in view of the aforementioned problem, and an object of the present invention is to provide a novel and improved control device and control method that make it possible to perform an inter-device authentication process more certainly and improve security.

According to an aspect of the present invention, there is provided a control device comprising, a control section configured to control an authentication process of performing a process related to device authentication together with at least one communication device on a basis of information included in a signal received through wireless communication with the communication device, wherein the control section performs control in such a manner that authentication information is changed for each process group in which the authentication process is repeated more than once, the authentication information being information to be used for the authentication process.

According to another aspect of the present invention, there is provided a control method comprising, by a processor, controlling an authentication process of performing a process related to device authentication together with at least one communication device on a basis of information included in a signal received through wireless communication with the communication device, wherein authentication information is changed for each process group in which the authentication process is repeated more than once, the authentication information being information to be used for the authentication process.

As described above, according to the present invention, it is possible to perform the inter-device authentication process more certainly and improve security.

BRIEF DESCRIPTION OF THE DRAWINGS

FIG. 2 is a sequence diagram illustrating an example of a basic flow of an authentication process according to the embodiment.

FIG. 3 is a diagram for describing a case where authentication fails because there is a gap in recognition of a signal in a ranging process repeated more than once.

FIG. 4 is a sequence diagram illustrating an example of an authentication process based on a distance according to the embodiment.

FIG. 5 is a sequence diagram illustrating an example of a flow of processes for changing authentication information when a process group L starts according to the embodiment.

DETAILED DESCRIPTION OF THE EMBODIMENT(S)

Figure 1:
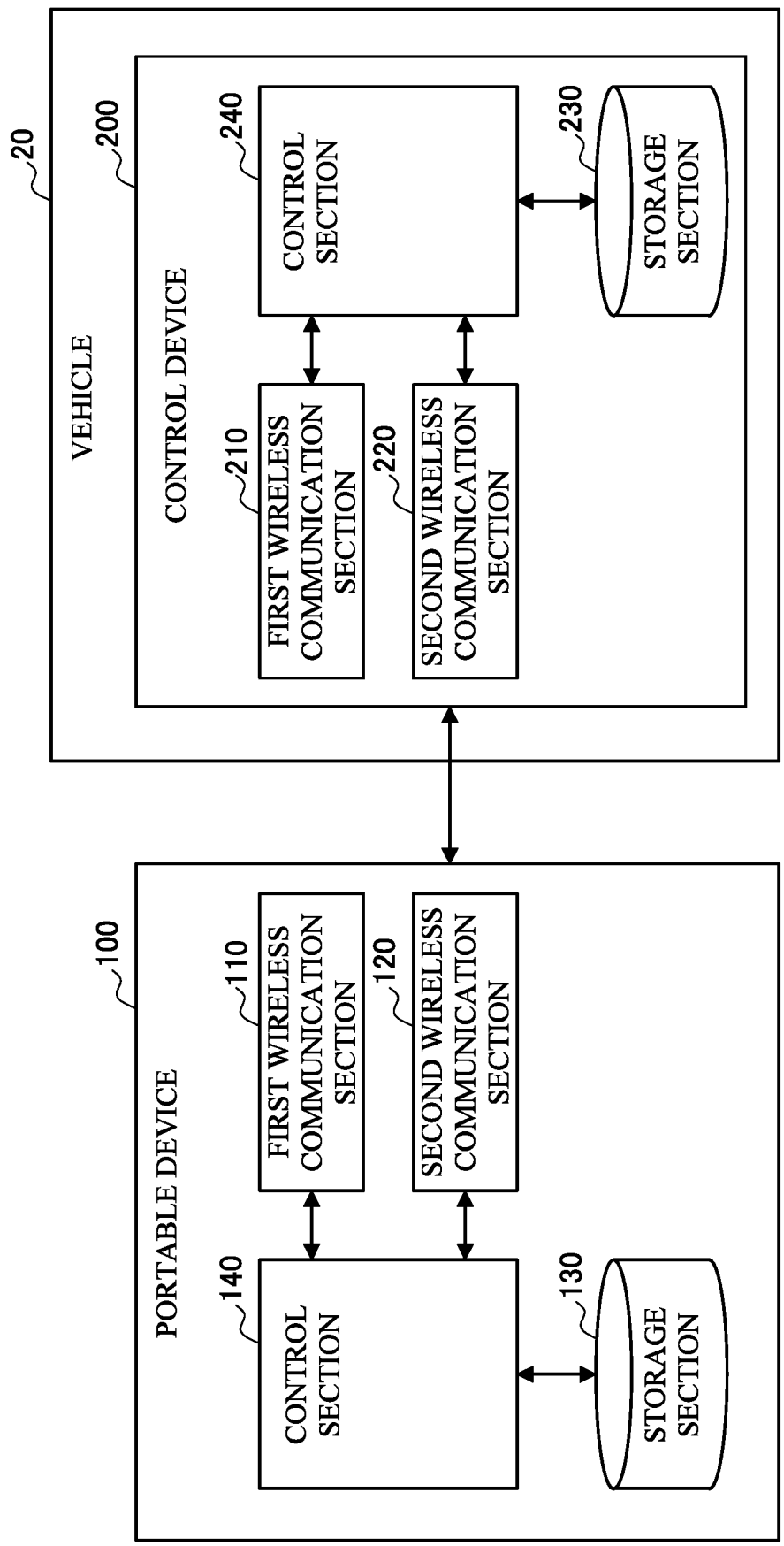
FIG. 1 is a diagram illustrating an example of a configuration of a system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Configuration Example

FIG. 1 is a diagram illustrating an example of a configuration of a system 1 according to an embodiment of the present invention. As illustrated in FIG. 1, the system 1 according to the present embodiment includes a portable device 100 and a control device 200. For example, the control device 200 according to the present embodiment is installed in a vehicle 20. The vehicle 20 is an example of a mobile object, which is an example of a target to be used by a user.

A communication device and a control device are involved in the present invention. The communication device is an authenticatee. The control device includes a control section configured to perform an authentication process of authenticating another communication device by using information obtained through communication with the communication device. In the example illustrated in FIG. 1, the portable device 100 is an example of the communication device, and the control device 200 is an example of the control device. For example, when a user such as a driver of the vehicle 20 carrying the portable device 100 approaches the vehicle, the system 1 performs wireless communication for authentication between the portable device 100 and the control device 200 installed in the vehicle 20. Next, when the authentication succeeds, the vehicle 20 becomes available for the user by opening a door lock of the vehicle 20 and starting an engine of the vehicle 20. The system 1 is also referred to as a smart entry system. Next, respective structural elements will be described sequentially.

(1-1) Portable Device 100

The portable device 100 is configured as an arbitrary device. Examples of the arbitrary device include devices such as an electronic key, a smartphone, and a wearable terminal, which are used while being carried by the user such as the driver. As illustrated in FIG. 1, the portable device 100 includes a first wireless communication section 110, a second wireless communication section 120, a storage section 130, and a control section 140.

The first wireless communication section 110 has a function of performing communication with the control device 200 in conformity with a first wireless communication standard. The second wireless communication section 120 has a function of performing communication with control device 200 in conformity with a second wireless communication standard that is different from the first wireless communication standard. In particular, the second wireless communication standard is more appropriate for ranging than the first wireless communication standard, and the second wireless communication section 120 mainly handle communication related to the ranging.

Here, the first wireless communication standard may satisfy at least any of a requirement that the first wireless communication standard achieves higher gain than the second wireless communication standard and a requirement that the first wireless communication standard achieves lower electric power consumption on a reception side than the second wireless communication standard. As a specific example that satisfies such a requirement, the second wireless communication standard may use a carrier wave of higher frequency than frequency of a carrier wave used under the first wireless communication standard. As the frequency of the carrier wave gets higher, attenuation based on distance gets larger and the gain gets reduced. As the frequency of the carrier wave gets lower, attenuation based on distance gets smaller and the gain gets increased. Accordingly, the above-described requirement related to the gain is satisfied. In addition, when the carrier wave has a high frequency, effects on a human body such as absorption into the human body get larger, and the gain gets reduced.

Note that, considering that sampling frequency is set depending on a maximum value of frequency of the carrier wave, it is sufficient to satisfy at least a requirement that maximum frequency of the carrier wave based on the second wireless communication standard is higher than maximum frequency of the carrier wave based on the first wireless communication standard.

For example, in accordance with the first wireless communication standard, a radio frequency (RF) band signal and a low frequency (LF) band signal may be used. In a typical smart entry system, the RF band signal is used for transmission from the portable device 100 to the control device 200 of the vehicle 20, and the LF band signal is used for transmission from the control device 200 of the vehicle 20 to the portable device 100. Next, the following description will be given on an assumption that the first wireless communication section 110 is configured as a communication interface that makes it possible to perform communication by using the RE band signal and the LF band signal. In other words, in the following description, it is assumed that the RF band signal is used for transmission to the control device 200 of the vehicle 20, and the LF band signal is used for reception from the control device 200 of the vehicle 20.

For example, in accordance with the second wireless communication standard, an ultra-wideband (UWB) signal may be used. An UWB impulse signal has a property that makes it possible to perform positioning and ranging with high accuracy. In other words, it is possible to measure air propagation time of a radio wave with high accuracy by using the radio wave of ultra-short pulse width of nanoseconds or less, and it is possible to perform positioning and ranging on the basis of the propagation time. Next, it is assumed that the second wireless communication section 120 is configured as a communication interface that makes it possible to perform communication by using the UWB signal.

Note that, the UWB signal may be transmitted/received as a ranging signal and a data signal. The ranging signal is a signal transmitted and received in the ranging process (to be described later). For example, the ranging signal may be configured in a frame format that does not include a payload part for storing data or in a frame format that includes the payload part. The data signal is a signal that carries data. The data signal is preferably configured in the frame format that includes the payload part for storing the data. Hereinafter, it is assumed that the ranging signal is configured in the frame format that does not include the payload part for storing data. In addition, it is assumed that the data signal is configured in the frame format that includes the payload part for storing the data.

The storage section 130 has a function of storing various kinds of information for operating the portable device 100. For example, the storage section 130 stores a program for operating the portable device 100, and an identifier (an example of identification information), password, and authentication algorithm for authentication, etc. For example, the storage section 130 includes a storage medium such as flash memory and a processing device that performs recording/playback on/of the storage medium.

The control section 140 has a function of controlling overall operation performed by the portable device 100. For example, the control section 140 controls the first wireless communication section 110 and the second wireless communication section 120 to communicate with the communication unit 200 of the vehicle. In addition, the control section 140 reads information from the storage section 130 and writes information into the storage section 130. The control section 140 also functions as an authentication control section that controls an authentication process between the vehicle and the control device 200. For example, the control section 140 includes an electronic circuit such as a microprocessor and a central processing unit (CPU).

(1-2) Control Device 200

The control device 200 is prepared in association with the vehicle. Here, the control device 200 is assumed to be installed in the vehicle 20. For examples of the installation position, the control device 200 may be installed in a vehicle interior of the vehicle 20, may be built in the vehicle 20 as a control module or a communication module, or may be installed in other ways. Alternatively, the control device 200 may be prepared as a separate object from the target to be used by the user in such a manner that the control device 200 is installed in a parking space for the vehicle 20 or in other manners. In this case, the control device 200 may wirelessly transmit a control signal to the vehicle 20 on the basis of a result of communication with the portable device 100 and may remotely control the vehicle 20. As illustrated in FIG. 1, the control device 200 includes a first wireless communication section 210, a second wireless communication section 220, a storage section 230, and a control section 240.

The first wireless communication section 210 has a function of performing communication with portable device 100 in conformity with the first wireless communication standard. Next, it is assumed that the first wireless communication section 210 is configured as a communication interface that makes it possible to perform communication by using the RF band signal and the LF band signal.

In addition, the second wireless communication section 220 has a function of performing communication with portable device 100 in conformity with the second wireless communication standard that is different from the first wireless communication standard. Next, it is assumed that the second wireless communication section 220 is configured as a communication interface that makes it possible to perform communication by using the UWB signal. The vehicle 20 may be provided with a plurality of the second wireless communication sections 220.

The storage section 230 has a function of storing various kinds of information for operating the control device 200. For example, the storage section 230 stores a program for operating the control device 200, and an identifier (an example of identification information), password, and authentication algorithm for authentication, etc. For example, the storage section 230 includes a storage medium such as flash memory and a processing device that performs recording/playback on/of the storage medium.

The control section 240 has a function of controlling overall operation performed by the control device 200 and in-vehicle equipment installed in the vehicle. For example, the control section 240 controls the first wireless communication section 210 and the second wireless communication section 220 to communicate with the portable device 100. In addition, the control section 240 reads information from the storage section 230 and writes information into the storage section 230. The control section 240 also functions as an authentication control section that controls the authentication process between the portable device 100 and the control device 200 of the vehicle 20. In addition, the control section 240 also functions as a door lock control section that controls the door lock of the vehicle, and opens and closes the door lock. The control section 240 also functions as an engine control section that controls the engine of the vehicle, and starts/stops the engine. Note that, a motor or the like may be installed as a power source of the vehicle in addition to or instead of the engine. For example, the control section 240 may be configured as an electronic control unit (ECU).

Note that, the control device 200 illustrated in IG. 1 is an example of the control device according to the present invention. The configuration of the control device according to the present invention is not limited to the example illustrated in FIG. 1. For example, the control device may include a communication module including the first wireless communication section 210, a communication module including the second wireless communication section 220, and a control module including the control section 240. In addition, the configuration of the control device according to the present invention may be implemented as the communication module including the first wireless communication section 210, the communication module including the second wireless communication section 220, and the control module including the control section 240. The modules are connected via a wired or wireless communication network. For example, the communication network may be an in-vehicle communication network that meets any standard such as a Controller Area Network (CAN), a Local Interconnect Network (LIN), or a local area network (LAN).

In addition, the configurations of the respective devices illustrated in FIG. 1 are mere examples. For example, according to the configuration illustrated in FIG. 1, each of the portable device 100 and the control device 200 includes the first wireless communication section and the second wireless communication section. However, the present invention is not limited thereto. For example, each of the portable device 100 and the control device 200 may include a wireless communication section that performs communication in conformity with a single wireless communication standard. The vehicle 20 may be provided with a plurality of the wireless communication sections. The wireless communication section transmits and receives signals to be used for the authentication process. Note that, any frequency band can be used when the wireless communication section transmits a signal to be used for the authentication process. For example, the signals used for the authentication process may be transmitted as the UWB signal, the LF band signal, the RF band signal, or the Bluetooth Low Energy (BLE) (registered trademark) signal.

2. Authentication Process

The smart entry system sometimes authenticates the portable device 100 on the basis of a distance between the portable device 100 and the control device 200 installed in the vehicle. The authentication process according to the present embodiment includes a process of measuring the distance between the portable device 100 and the control device 200 (also referred to as a "ranging process" in this specification) and a process of performing authentication based on a result of measuring the distance. The authentication based on the distance makes it possible to reduce distance fabrication and authenticatee spoofing such as a relay attack, which is a technique of relaying a transmission signal of the control device (authenticatee) of the vehicle and indirectly establishing communication between the portable device (authenticatee) and the control device by using a relay and improperly making the authentication successful. This makes it possible to effectively enhance accuracy of the authentication.

FIG. 2 is a sequence diagram illustrating an example of a basic flow of the authentication process according to the present embodiment. As illustrated in FIG. 2, the portable device 100 first transmits a ranging trigger signal (Step S103). According to the present embodiment, for example, the portable device 100 transmits a signal (ranging trigger signal) for instructing to transmit a first ranging signal before the control device 200 transmits the first ranging signal. Note that, the ranging trigger signal is also an example of the ranging signal. For example the UWB signal is used for the ranging trigger signal. Specifically, the portable device 100 may transmit the ranging trigger signal via the second wireless communication section 120.

Next, when the ranging trigger signal is received, the control device 200 transmits a ranging request signal for requesting a response for the ranging process, as the first ranging signal (Step S106). For example the UWB signal is used for the ranging request signal. Specifically, the control device 200 may transmit the ranging request signal via the second wireless communication section 220.

Next, when the ranging request signal (first ranging signal) is received from the control device 200 and a time period $\Delta T2$ elapses after the reception of the ranging request signal (first ranging signal) from the control device 200, the portable device 100 transmits a ranging response signal in response to the ranging request, as the second ranging signal (Step S109). For example the UWB signal is used for the ranging response signal. Specifically, the portable device 100 may transmit the ranging response signal via the second wireless communication section 120. The time period $\Delta T2$ is a pre-designated time period. The time period $\Delta T2$ is set to be longer than a time period, which is assumed to be required for a process from time when the portable device 100 receives the first ranging signal to time when the portable device 100 transmits the second ranging signal. This makes it possible to certainly finish preparation for transmission of the second ranging signal before the time period ΔT2 elapses after reception of the first ranging signal. The time period ΔT2 may also be known to the control device 200.

Next, when the ranging response signal (second ranging signal) is received, the control section 240 of the control device 200 calculates a distance between the portable device 100 and the control device 200 (Step S112). Specifically, the control device 200 measures the time period ΔT1 from transmission time of the first ranging signal to reception time of the second ranging signal, and calculates the distance on the basis of the measured time period ΔT1 and the known time period ΔT2. The control device 200 may calculate time taken to transmit or receive a one-way signal by subtracting ΔT2 from ΔT1 and dividing the subtracted value by 2, and then calculate the distance between the portable device 100 and the communication device 200 by multiplying the calculated time by speed of the signal. Note that, the time period ΔT2 does not have to be known to the control device 200. For example, the portable device 100 may measure the time period ΔT2 and report the measured time period ΔT2 to the control device 200. Such a report may be made by transmitting a data signal including information obtained by encrypting information indicating the time period ΔT2. The data signal is another example of the signal for the ranging process. The data signal is a signal that stores and carries data. The data signal is configured in the frame format that includes the payload part for storing the data. In addition, the data signal may be transmitted and received as the UWB signal.

Note that, the distance may be calculated in Step S112 by the control section of a communication unit in the case where the second wireless communication section 220 is configured as the communication unit. In this case, the communication unit transmits a calculation result to the control section 140 via an in-vehicle communication network. In addition, the vehicle 20 may be provided with a plurality of the second wireless communication sections 220. The control section 240 may calculate the distance between the portable device 100 and the control device 200 on the basis of data transmitted and received between the portable device 100 and the plurality of second wireless communication sections 220.

Next, the control section 240 of the control device 200 authenticates the portable device 100 on the basis of whether or not the calculated distance satisfies a predetermined condition (Step S115). For example, the control section 240 determines that the authentication succeeds if the calculated distance is a predetermined value or less. If not, the control section 240 determines that the authentication ends in failure. In addition, if the calculated distance falls within a predetermined range, the control section 240 may determine that authentication for performing corresponding predetermined control succeeds. For example, in the case where a distance between the user carrying the portable device 100 and the vehicle 20 provided with the control device 200 falls within the predetermined range, the control section 240 determines that authentication for controlling a light installed in the vehicle 20 and causing the light to turn on succeeds, and the control unit 210 performs control in such a manner that the light is turned on. Next, in the case where the user approaches the vehicle 20 more, the control section 240 may determine that authentication for controlling the door lock and opening the door lock of the vehicle 20 succeeds, and may perform control in such a manner that the door lock is opened.

<Summary of Issues>

Here, the above-described ranging trigger signal, ranging request signal, and ranging response signal include predetermined information for authentication. The "predetermined information for authentication" is referred to as "authentication information" in this specification. The device that has received the signal determines whether or not the received signal is a signal transmitted from a partner paired with the own device, on the basis of the authentication information included in the signal. The authentication information may be the ID of the device, or may be information obtained by encrypting some kind of designated information. For example, the information may be encrypted by using an encryption key that is shared in advance between a device serving as a transmitter of a signal and a device serving as a receiver of the signal. In the case of the encrypted information, the device serving as the receiver of the signal decrypts the encrypted information. In the case where the decryption succeeds, the device serving as the receiver of the signal can determine that the signal is transmitted from the partner paired with the own device.

However, in the case where the ranging process is repeated more than once and the authentication information to be used for the ranging trigger signal, the ranging request signal, and the ranging response signal that are transmitted and received in each ranging process is changed for each ranging process in view of security, there may be a gap in recognition of a signal between the portable device 100 and the control device 200 if a single signal is missed. In this case, it may be impossible to perform the ranging process even when the signal is successfully received. Next, details thereof will be described with reference to FIG. 3.

FIG. 3 is a diagram for describing a case where authentication fails because there is a gap in recognition of a signal in the ranging process repeated more than once. FIG. 3 illustrates the gap in recognition of a signal with regard to a control device 201 according to a comparative example. Note that, the control device 201 is a device including a plurality of second wireless communication sections 221a and 221b, and is installed in the vehicle 20. A relative position of the portable device 100 to the vehicle 20 may be calculated more accurately by calculating a distance between the vehicle 20 and the second wireless communication section 221a and a distance between the vehicle 20 and the second wireless communication section 221b and synthesizing the calculated distances. The plurality of second wireless communication sections 221 are installed at different positions on the vehicle 20.

As illustrated in FIG. 3, the portable device 100 first transmits a first ranging trigger signal in a first ranging process r1 (Step S203). For example, the ranging trigger signal may be the UWB signal. In addition, the portable device 100 transmits the ranging trigger signal including designated authentication information a, which is used for the first ranging process r1. The designated authentication information a may be obtained by encrypting designated information with a common encryption key. The designated information is used for the first ranging process r1.

Next, the second wireless communication section 210 that has successfully received the ranging trigger signal transmits a ranging request signal (Step S206). Specifically, in the case where the control device 201 decrypts the encrypted information included in the ranging trigger signal and the decrypted information is identical to the designated information that is known in advance, it is possible to determine that the received signal is a signal transmitted from a partner paired with the own device, and executes a process of transmitting the ranging request signal. For example, the ranging request signal is a UWB signal. In addition, the control device 201 transmits the ranging request signal including the designated authentication information a, which is used for the first ranging process r1. The designated authentication information a may be obtained by encrypting designated information with a common encryption key. The designated information is used for the first ranging process r1.

Next, the portable device 100 transmits the ranging response signal (Step S209) when a predetermined time period (ΔT2 described above) elapses after reception of the ranging request signal. Even in this case, it is possible to determine that the received signal is a signal transmitted from the partner paired with the own device, and executes a process of transmitting the ranging response signal when the portable device 100 decrypts the encrypted information included in the ranging request signal and the decrypted information is identical to the designated information that is known in advance. For example, the ranging response signal is a UWB signal. In addition, the portable device 100 transmits the ranging response signal including the designated authentication information a, which is used for the first ranging process r1. The designated authentication information a may be obtained by encrypting designated information with a common encryption key. The designated information is used for the first ranging process r1.

Next, when the ranging response signal is successfully received, the second wireless communication section 221a notifies the control section 241 of the reception of the ranging response signal, and the control section 241 calculates a distance between the second wireless communication section 221a and the portable device 100 (first ranging) (Step S212).

Next, a second ranging process r2 is performed. In this authentication process, the above-described ranging process r is repeatedly performed more than once. The control device 201 repeats the ranging process r corresponding to Step S103 to Step S112 illustrated in FIG. 2 more than once, acquires a representative value (distance) on the basis of results of the ranging process repeated more than once, and performs final authentication corresponding to Step S115 described above. This makes it possible to perform authentication between the portable device 100 and the control device 201 on the basis of a more certain distance.

In the second ranging process r2, it may be considered that the authentication information to be used for each signal is changed in view of security. For example, the portable device 100 transmits a second ranging trigger signal in a second ranging process r2 (Step S215). The portable device 100 transmits the ranging trigger signal including designated authentication information b, which is used for the second ranging process r2. The designated authentication information b may be obtained by encrypting designated information with a common encryption key. The designated information is used for the second ranging process r2.

Here, it is assumed that the second wireless communication section 221b misses the ranging trigger signal transmitted in Step S230 described above, but successfully receives the second ranging trigger signal transmitted in Step S215 described above. In this case, the control section 241 recognizes the ranging trigger signal as the ranging trigger signal of the first ranging process r1, and makes a determination on the basis of this recognition. Therefore, ranging ends in failure (Step S218). Specifically, the control section 241 makes a determination on the basis of authentication information included in the ranging trigger signal. The control section 241 decrypts the encrypted information that is the authentication information included in the ranging trigger signal, and makes a determination on the basis of whether or not the decrypted information is identical to designated information that is known in advance. However, in view of security, different designated information is used for each ranging process. Therefore, the control section 241 recognizes the second ranging process r2 as the first ranging process r2 and makes a determination on the basis of the authentication information although the current process is actually the second ranging process. Accordingly, there is a possibility that the control section 241 may determine that the authentication information is not identical to the designated information, the second wireless communication section 221b does not transmits the ranging request signal, and ranging may end in failure. Note that, it is also possible for the second wireless communication section 221b to makes such a determination.

On the other hand, in a way similar to the first ranging process r1, the second wireless communication section 221a performs the second ranging process r2 normally (Step S221 to Step S227).

As described above, in the case where the authentication process is repeated more than once to calculate the distance more certainly and authentication information to be used for each authentication process is changed in view of security, there is gap in recognition and it is impossible to perform ranging. This results in reduction in certainty of a calculated distance. In addition, it is also difficult for the control section 241 to recognize a relative position of the portable device 100 to the vehicle 20, on the basis of the respective distances between the portable device 100 and the second wireless communication sections 221. Recognition of the relative position includes recognition of the position of the portable device 100 such as an inside or an outside of the vehicle, for example.

Therefore, according to an embodiment of the present invention, the authentication information to be used for a signal related to the inter-device authentication process is changed for each process group in which the authentication process is repeated more than once. This makes it possible to calculate the distance more certainly and improve security. For example, when the authentication process is repeated more than once, the authentication information to be used for each signal such as the ranging trigger signal or the ranging request signal is not changed. This makes it possible to calculate the distance more certainly. In addition, the authentication information is changed when a new process group starts. This makes it possible to improve security. In the process group, an authentication process is repeated a designated number of times.

Note that, the second wireless communication section 221b may be controlled in such a manner that the second wireless communication section 221b enters a reception waiting state before receiving the ranging trigger signal transmitted from the portable device 100 in Step S203. The reception waiting state means a state for performing a process of importing a received signal. The second wireless communication section 221b may be controlled in such a manner that the second wireless communication section 221b enters the reception waiting state for receiving the ranging trigger signal at an arbitrary timing, on the basis of communication performed between the portable device 100 and the control device 201 before the portable device 100 transmits the ranging trigger signal by using the UWB. The preceding communication may be performed by the first wireless communication section capable of performing communication using the RF band signal and the LF band signal.

Next, technical features of the embodiment of the present invention will be described.

4. Technical Features

FIG. 4 is a sequence diagram illustrating an example of a flow of an authentication process based on a distance according to the present embodiment. In the present specification, the "authentication process based on a distance" includes a ranging process of measuring a distance between the portable device 100 and the control device 200, and an authentication process of performing authentication on the basis of the distance measured through the ranging process. FIG. 4 illustrates an operation process to describe a flow of ranging processes. The ranging process may be repeatedly performed more than once. The control device 200 acquires a representative value (distance) on the basis of results (distances) of the ranging process performed more than once, and performs final authentication corresponding to Step S115 described above. This makes it possible to perform authentication between the portable device 100 and the control device 200 on the basis of a more certain distance. In addition, the control device 200 includes the plurality of wireless communication sections 220a and 220b. The control device 200 may calculate a relative position of the portable device 100 to the vehicle 20 more accurately in each ranging process, by calculating a distance between the vehicle 20 and the second wireless communication section 221a and a distance between the vehicle 20 and the second wireless communication section 220b and synthesizing the calculated distances. The plurality of second wireless communication sections 221 are installed at different positions on the vehicle 20.

As illustrated in FIG. 4, the portable device 100 first transmits a first ranging trigger signal in a first ranging process r1 (Step S303). Before the control device 200 transmits a ranging request signal, the portable device 100 transmits the ranging trigger signal that notifies of start of the ranging process. This makes it possible to reduce the waste of electricity during an unnecessary waiting time, and improve the success rate of ranging and responsiveness. For example, the ranging trigger signal may be the UWB signal. In addition, the portable device 100 transmits the ranging trigger signal including designated authentication information a, which is used for the first ranging process r1. The designated authentication information a may be obtained by encrypting designated information A with a common encryption key. The designated information A is information for the ranging trigger signal of the first ranging process r1. By using the encrypted information, it is possible to further enhance security. In addition, original information, which is an encryption target such as the designated information A, may be information that is shared in advance with the portable device 100 or may be a random number. With regard to the encryption, a different common key may be used for each ranging signal, or the same common key may be used for each ranging signal. In this specification, the ranging signals include the ranging trigger signal, the ranging request signal, and the ranging response signal, for example. Since authentication information for each ranging signal is included, it is possible to reduce a possibility of misidentification of the right and wrong signals in case another second wireless communication section 220 receives the signal or the unauthorized tool fakes a distance. Note that, in the present embodiment, information obtained by encrypting designated information is used as the authentication information. However, the embodiment of the present invention is not limited thereto. For example, it is also possible to use identification information specific to the portable device 100 or identification information specific to the control device 200.

On the other hand, the second wireless communication sections 220a and 220b of the control device 200 is controlled in such a manner that the second wireless communication sections 220a and 220b enter the reception waiting state in advance, and wait for reception of the ranging trigger signal transmitted from the portable device 100. Here, the reception waiting state means a state for performing various kinds of processes to import a received signal. Examples of the various kinds of processes include a process in which an antenna of the second wireless communication section 220 receives a signal, a process in which the second wireless communication section 220 samples the received signal, a process in which the control section 240 performs a process based on a signal obtained through the sampling, and other processes. The control section 240 according to the present embodiment causes the second wireless communication section 220 to transition to the state of waiting for reception of the ranging trigger signal at an arbitrary timing, and waits for reception of the ranging trigger signal. Note that, the arbitrary timing is a timing at which communication is established between the portable device 100 and the control device 200 before the portable device 100 transmits the ranging trigger signal by using the UWB, for example. When the communication is established between the portable device 100 and the control device 200, the control section 240 performs control in such a manner that one or more second wireless communication sections 220 enter the reception waiting state for receiving the ranging trigger signal. The preceding communication may be performed by the first wireless communication section capable of performing communication using the RF band signal and the LF band signal, for example.

Next, the second wireless communication section 220a that has successfully received the ranging trigger signal transmits a ranging request signal (Step S306). Specifically, in the case where the control device 200 decrypts the encrypted information included in the ranging trigger signal and the decrypted information is identical to the designated information that is known in advance, it is possible to determine that the received signal is a signal transmitted from a partner paired with the own device, and execute a process of transmitting the ranging request signal. For example, the ranging request signal is a UWB signal. In addition, the control device 200 transmits the ranging request signal including the designated authentication information b, which is used for the first ranging process r1. The designated authentication information b may be obtained by encrypting designated information B with a common encryption key. The designated information B is information for the ranging request signal of the first ranging process r1.

Next, the portable device 100 transmits a ranging response signal (Step S309) when a predetermined time period (ΔT2 described above) elapses after reception of the ranging request signal. Even in this case, it is possible to determine that the received signal is a signal transmitted from the partner paired with the own device, and execute a process of transmitting the ranging response signal when the portable device 100 decrypts the encrypted information included in the ranging request signal and the decrypted information is identical to the designated information that is known in advance. For example, the ranging response signal is a UWB signal. In addition, the portable device 100 transmits the ranging response signal including designated authentication information c, which is used for the first ranging process r1. The designated authentication information c may be obtained by encrypting designated information C with a common encryption key. The designated information C is information for the ranging request signal of the first ranging process r1.

For example, in the present embodiment, different pieces of authentication information are used for the ranging trigger signal, the ranging request signal, and the ranging response signal, which are the ranging signals. This makes it possible to reduce a possibility of spoofing, and it is possible to improve security. The different pieces of authentication information may be obtained by encrypting the designated information A to designated information C with a single common encryption key. The designated information A to designated information C are different from each other. Alternatively, the different pieces of authentication information may be obtained by encrypting same designated information with different common encryption keys A to C. Note that, the present invention is not limited thereto. Same authentication information may be used for the ranging trigger signal, the ranging request signal, and the ranging response signal, which are the ranging signals. The same authentication information may be obtained by encrypting the same designated information with a single common encryption key. By using the same authentication information, it is possible to reduce a burden of preparation of the designated information and a burden of the encryption process.

Next, when the ranging response signal is successfully received, the second wireless communication section 220a notifies the control section 240 of the reception of the ranging response signal, and the control section 240 calculates a distance between the second wireless communication section 220a and the portable device 100 (first ranging) (Step S312).

Next, a second ranging process r2 is performed. Ranging signals of the second ranging process r2 use the same authentication information as the authentication information used for the ranging signals of the first ranging process r1. This makes it possible to execute the second ranging process r2 even in the case where the signal is not received in the first ranging process r1. It is possible to increase a possibility of successful ranging and perform the ranging more certainly. In addition, in a similar way, a repeated subsequent ranging process such as a third ranging process or a fourth ranging process uses the same authentication information as the first ranging process. This makes it possible to execute a next ranging process even in the case where the signal is not received in the second and third ranging process. Next, details thereof will be described.

In the second ranging process r2, the portable device 100 transmits a second ranging trigger signal (Step S315). The portable device 100 transmits the ranging trigger signal including the same authentication information a as the authentication information used for the ranging trigger signal in the first ranging process 1.

Here, it is assumed that the second wireless communication section 220b misses the ranging trigger signal transmitted in Step 303 described above, but successfully receives the second ranging trigger signal transmitted in Step S315 described above. In this case, the control section 240 recognizes the ranging trigger signal as the ranging trigger signal of the first ranging process r1. However, the received ranging trigger signal includes the authentication information a, which is the same as the first ranging process r1. Therefore, it is possible to determine that the received ranging trigger signal is a legitimate ranging trigger signal, and communication for the ranging is established (Step S318). Note that, it is also possible for the second wireless communication section 220b to makes such a determination.

Next, the control section 240 transmits the ranging request signal via the second wireless communication section 220b (Step S324). The control section 240 recognizes this ranging process as the first ranging process r1. Therefore, the ranging request signal includes the authentication information b for the ranging trigger signal of the first ranging process r1.

On the other hand, in a way similar to the first ranging process r1, the second wireless communication section 220a performs the second ranging process r2 normally (Step S321, Step S327, and Step S330). In other words, a distance between the second wireless communication section 220a and the portable device 100 is calculated (second ranging) (Step S330).

Next, when the portable device 100 recognizes this ranging process as the first ranging process r1 and receives the ranging request signal transmitted from the second wireless communication section 220b, the portable device 100 transmits the ranging response signal (Step S333) when a predetermined time period (ΔT2 described above) elapses after reception of the ranging request signal. The portable device 100 recognizes the received ranging request signal as the ranging request signal of the second ranging process r2 and makes a determination. This ranging request signal includes the authentication information b, which is the same as the first ranging process r1. Therefore, it is possible to determine that the ranging request signal is a legitimate ranging request signal. In such a way, the portable device 100 may transmit the ranging response signals.

Next, when the ranging response signal is successfully received, the second wireless communication section 220b notifies the control section 240 of the reception of the ranging response signal, and the control section 240 calculates a distance between the second wireless communication section 220b and the portable device 100 (first ranging) (Step S312). The control section 240 recognizes the received ranging response signal as the ranging response signal of the first ranging process r1 and makes a determination. This ranging response signal includes the authentication information c, which is the same as the first ranging process r1. Therefore, it is possible to determine that the ranging response signal is a legitimate ranging response signal. Note that, it is also possible for the second wireless communication section 220b to makes such a determination.

As described above, when the authentication process is repeated, all the ranging processes use the same authentication information for the ranging signals of the respective ranging processes. This makes it possible to reduce occurrence of an event in which the ranging is not performed because of a gap in recognition, and it is possible to calculate the distance more certainly. In addition, it is also possible for the control section 240 to acquire the distances between the portable device 100 and the plurality of second wireless communication sections 220 more certainly, and to recognize a relative position of the portable device 100 to the vehicle 20 more certainly. Recognition of the relative position includes recognition of the position of the portable device 100 such as an inside or an outside of the vehicle 20, for example.

In addition, in the present embodiment, it is possible to calculate the distances certainly and improve security while a process group L means the process of repeating the ranging process r, which has been described with reference to FIG. 4, the designated number of times, and the authentication information is changed when the process proceeds to a next process group L. The type of the authentication information obtained after changing the authentication information may be designated in advance. Next, with reference to FIG. 5, change in the authentication information accomplished when a new process group L is executed according to the present embodiment will be described.

FIG. 5 is a sequence diagram illustrating an example of a flow of processes for changing authentication information when the process group L starts according to the present embodiment. As illustrated in FIG. 5, a plurality of ranging processes r1 to rN are executed as a first process group L1 between the portable device 100 and the control device 200. For example, the ranging trigger signal, the ranging request signal, and the ranging response signal are transmitted and received in the ranging process r1 (Step S410). In addition, the ranging trigger signal, the ranging request signal, and the ranging response signal are transmitted and received in the ranging process rN (Step S413). Details of such ranging processes have already been described above with reference to FIG. 4. Same authentication information a to authentication information c are used for respective signals in the respective ranging processes. In such a way, it is possible to calculate a distance more certainly. The control device 200 acquires a representative value through the first process group L1 on the basis of distances obtained by repeating the ranging processes r the designated number of times. Note that, in the case where the authentication process is repeated in the single process group, different authentication information (authentication information a to c) may be used for the ranging trigger signal, the ranging request signal, and the ranging response signal as illustrated in FIG. 5. Alternatively, same authentication information may be used for the ranging trigger signal, the ranging request signal, and the ranging response signal. The wording "different authentication information (authentication information a to c) may be used for the ranging trigger signal, the ranging request signal, and the ranging response signal" means that authentication information varies depending on the signal types. For example, the authentication information a is used for the ranging trigger signal, the authentication information b is used for the ranging request signal, and the authentication information c is used for the ranging response signal. In this case, in the single process group, transmission and reception of signals including authentication information that varies depending on the signal types are repeated. In addition, the wording "same authentication information may be used" means that same authentication information (such as the authentication information a) is used for the ranging trigger signal, the ranging request signal, and the ranging response signal. In this case, in the single process group, transmission and reception of signals including the same authentication information are repeated.

Next, the portable device 100 notifies of start of a next process group L2 (Step S416). The notification of the start of the next process group L2 may be the UWB signal, the RF band signal, the LF band signal, a Bluetooth signal, or the like.

Next, the portable device 100 changes the authentication information to be used in the next process group L2 (Step S419). In addition, the control device 200 that has received the notification of the start of the next process group L2 changes the authentication information to be used in the next process group L2 (Step S421). The authentication information to be changed may be designated in advance. In addition, the notification of the start of the next process group L2 may indicate which authentication information to be used.

Next, the plurality of ranging processes r1 to rN are executed as the second process group L2 between the portable device 100 and the control device 200. For example, the ranging trigger signal, the ranging request signal, and the ranging response signal are transmitted and received in the ranging process r1 (Step S424). In addition, the ranging trigger signal, the ranging request signal, and the ranging response signal are transmitted and received in the ranging process rN (Step S427). Same authentication information d to authentication information f are used for respective signals in the respective ranging processes, but the authentication information d to authentication information f are different from the authentication information used in the first process group L1. This makes it possible to calculate the distance more certainly, and improve security. The control device 200 acquires a representative value through the second process group L2 on the basis of distances obtained by repeating the ranging processes r the designated number of times. The control device 200 acquires a distance between the portable device 100 and the control device 200 to be used for final authentication on the basis of the representative values acquired through the respective process groups L, and authenticates the portable device 100 on the basis of whether or not the distance falls within a predetermined range. This makes it possible to perform authentication based on a more accurate distance. Alternatively, the system 1 according to the present invention may execute the process group L2, in which the authentication process is repeated more than once, again in the case where the authentication based on a representative value acquired through the process group L1, in which the authentication process is repeated more than once, ends in failure. In addition, the number of times of execution of the process group L may be a designated number of times.

The operation processes illustrated in FIG. 4 and FIG. 5 are examples of the embodiment of the present invention, and the present invention is not limited thereto. For example, in the case where the second wireless communication section 220 is configured as a communication unit, at least any of the above-described processes in Step S312, Step S318, Step S330, Step S336, and Step S421 may be controlled by a control section (not illustrated) of the second wireless communication section 220.

In addition, the arbitrary timing of causing the second wireless communication section 220 to transition to the reception waiting state before Step S303 described above may be a timing at which the control device 200 receives a predetermined signal from the portable device 100 via the first wireless communication section 210, a period during which the control device 200 authenticates the portable device 100 on the basis of the predetermined signal that has been received, or a timing that comes after the authentication ends. In other words, it is also considered that a predetermined signal is transmitted and received between the portable device 100 and the control device 200 before Step S303 described above. In the case of transmitting/receiving any predetermined signal between the portable device 100 and the control device 200, the signal may be transmitted/received between the first wireless communication section 110 of the portable device 100 and the first wireless communication section 210 of the control device 200.

For example, the request response authentication is performed between the portable device 100 and the control device 200. In the request response authentication, an authentication request signal and an authentication response signal generated on the basis of the authentication request are transmitted and received. The request response authentication is an authentication method in which an authenticator generates an authentication request signal and transmits the generated authentication request signal to an authenticatee, the authenticatee generates an authentication response signal on the basis of the authentication request signal and transmits the generated authentication response signal to the authenticator, and the authenticator authenticates the authenticatee on the basis of the authentication response signal. Typically, the authentication request signal is a random number, which is changed with each authentication. Accordingly, the request response authentication is resistant to a replay attack. In addition, the authentication response signal is generated on the basis of the information regarding the authenticatee. For example, the information regarding the authenticatee is an ID, a password, and the like. The ID and the password themselves are not transmitted/received. This makes it possible to reduce a possibility of eavesdropping. More specifically, for example, in response to a first authentication signal transmitted as an authentication request from the control device 200, a second authentication signal is transmitted as an authentication response. The second authentication signal is a signal calculated by the portable device 100 on the basis of the first authentication signal and key information such as a prestored password. In the case where the second authentication signal transmitted as the authentication response is admitted as a signal indicating a proper value calculated from the key information and the first authentication signal serving as the authentication request, the control device 200 may determine that the portable device 100 is successfully authenticated.

In addition, it is also possible to transmit/receive a wake-up signal for instructing to activate the device, and a response to the wake-up signal between the portable device 100 and the control device 200. The wake-up signal can cause a receiver to wake up from a sleep mode. Examples of the response to the wake-up signal include an acknowledgment (ACK) signal that indicates activation, and a negative acknowledgement (NACK) signal that indicates non-activation.

Alternatively, before waiting for reception of the ranging trigger signal, a response to the wake-up signal may be communicated and the request response authentication may be performed between the portable device 100 and the control device 200. The control device 200 starts waiting for reception of the ranging trigger signal on the basis of such a response to the wake-up signal and the request response authentication.

The control device 200 starts waiting for reception on the basis of the response to the wake-up signal or the request response authentication. This makes it possible to shorten the reception waiting period. In addition, it is possible to further improve accuracy of authentication by adding one-stage authentication process based on another method before the authentication process based on a distance.

Note that, a signal transmitted from one device to another device with regard to the response to the wake-up signal and the request response authentication is also referred to as a first notification signal. In addition, a signal transmitted from a device that has received the first notification signal to a device that has transmitted the first notification signal is also referred to as a second notification signal. Each device determines that a partner device is successfully authenticated only in the case where a proper second authentication signal corresponding to the first authentication signal is transmitted in response to the first authentication signal. Any frequency band can be used for transmitting the first and second notification signals. For example, the notification signal may be transmitted by using a same frequency band as the ranging signal such as the ranging trigger signal or the ranging request signal, or by using a different frequency band from the ranging signal. In addition, the notification signal may be transmitted as the UWB signal, the LF band signal, the RF band signal, or the Bluetooth Low Energy (BLE) (registered trademark) signal.

In addition, for example, even in the case of the first notification signal, the second notification signal, and the like, it is also possible to use same authentication information for respective processes but change the authentication information when the process proceeds to a next process group. For example, in the case where the request response authentication or the like is performed more than once, same authentication information may be used for respective processes, but it is possible to change the authentication information when the request response authentication is again performed more than once.

5 Conclusion

Although details of the preferable embodiments of the present invention have been described above with reference to the appended drawings, the present invention is not limited thereto. It will be clear to a person of ordinary skill in the art of the present invention that various modifications and improvements may be obtained within the scope of the technical idea recited by the scope of the appended claims, and it should be understood that they will naturally come under the technical scope of the present invention.

For example, although the example in which the authenticator transmits the first ranging signal has been described in the above embodiment, the present invention is not limited thereto. The authenticator is the control device 200 of the vehicle 20, for example. For example, it is also possible for the authenticatee to transmit the first ranging signal. The authenticatee is the portable device 100, for example. When the first ranging signal is received from the portable device 100, the control device 200 transmits the second ranging signal in response to the first ranging signal. When the second ranging signal is received, the portable device 100 measures a time period $\Delta T1$ that is a time period from transmission time of the first ranging signal to reception time of the second ranging signal. Next, the portable device 100 transmits data signal including information obtained by encrypting information indicating the measured time period $\Delta T1$. On the other hand, the control device 200 measures a time period $\Delta T2$ from reception time of the first ranging signal to transmission time of the second ranging signal. Next, when the data signal is received from the portable device 100, the control device 200 calculates the distance between the portable device 100 and the control device 200 on the basis of the measured time period $\Delta T2$ and the time period $\Delta T1$ indicated by the data signal received from the portable device 100. For example, time taken to transmit or receive a one-way signal is calculated by subtracting $\Delta T2$ from $\Delta T1$ and dividing the subtracted value by 2, and then a distance between the portable device and the control device is calculated by multiplying the calculated time by speed of the signal. As described above, in the case where the directions of transmitting and receiving the first ranging signal and the second ranging signal are reversed, the control device 200 performs control in such a manner that the control device 200 transitions to the waiting state of waiting for the first ranging signal transmitted from the portable device 100. The control device 210 may transition to the waiting state of waiting for the first ranging signal at any timing.

In addition, although the example in which the portable device 100 serves as the authenticatee and the control device 200 of the vehicle 20 serves as the authenticator has been described in the above embodiment, the present invention is not limited thereto. The roles of the portable device 100 and the control device 200 of the vehicle 20 may be reversed, or the roles may be switched dynamically. In addition, the ranging and authentication may be performed between the control devices 200 of the vehicles 20.

In addition, although the example in which the portable device 100 serves as an example of the communication device and the control device 200 serves as an example of the control device has been described in the above embodiment, the present invention is not limited thereto. The portable device 100 may serves as an example of the control device, and the control device 200 may serve as an example of the communication device.

In addition, for example, although the example in which the present invention is applied to the smart entry system has been described in the above embodiment, the present invention is not limited thereto. The present invention is applicable to any system that performs the ranging and authentication by transmitting/receiving signals. Examples of the target to be used by the user includes a drone, a vehicle, a ship, an airplane, a building, a robot, a locker, and a home appliance, and the like. Examples of the building include a house and the like. In addition, the present invention is applicable to a pair of any two devices selected from a group including portable devices, vehicles, ships, airplanes, smartphones, drones, buildings, robots, lockers, home appliances, and the like. Note that, the pair may include two device of a same type, or may include two devices of different types. In this case, one of the devices operates as a first communication device and the other device operates as a second communication device.

In addition, for example, in the above embodiment, the standard using the UWB has been exemplified as the wireless communication standard. However, the present invention is not limited thereto. For example, it is also possible to use a standard using infrared as the wireless communication standard.

In addition, for example, although the above embodiment has been described on the assumption that the control section 240 is configured as the ECU and controls overall operation of the control system 200, the present invention is not limited thereto. For example, each of the first wireless communication section 210 and the second wireless communication section 220 may include an ECU. In this case, the first wireless communication section 210 and the second wireless communication section 220 may also be referred to as the mobile-object-mounted communication device. In a way similar to the control device 200 described above, the mobile-object-mounted communication device may execute a process based on authentication information included in a received signal, or a process of controlling transition to the reception waiting state.

Note that, the series of processes performed by the devices described in this specification may be achieved by any of software, hardware, and a combination of software and hardware. A program that configures the software is stored in advance in, for example, a recording medium (non-transitory medium) installed inside or outside the devices. In addition, for example, when a computer executes the programs, the programs are read into RAM, and executed by a processor such as a CPU. The recording medium may be a magnetic disk, an optical disc, a magneto-optical disc, flash memory, or the like, for example. Alternatively, the above-described computer program may be distributed via a network without using the recording medium, for example.

Further, in this specification, the processes described using the sequence diagrams and flowcharts are not necessarily executed in the order illustrated in the drawings. Some processing steps may be executed in parallel. In addition, additional processing steps may be employed and some processing steps may be omitted.

What is claimed is:

1. A control device, comprising:
a processor configured to control an authentication process of performing a process related to device authentication together with at least one communication device on a basis of information included in a signal received through wireless communication with the communication device,
wherein the processor performs the control in such a manner that authentication information is changed for each process group in which the authentication process is repeated more than once, the authentication information being information to be used for the authentication process,
the authentication information is encrypted information,
in a case where the processor is notified of execution of a process group in which the authentication process is repeated a designated number of times, the processor changes the authentication information in such a manner that the authentication information becomes different from the authentication information used for the process group executed before the notification,
signals transmitted or received in the authentication process include a trigger signal that notifies of a start of the authentication process, a request signal that is returned and requests a response in a case where the trigger signal is received, and a response signal that is returned and responds to the request in the case where the request signal is received,
the processor executes the process group in which the authentication process is repeated more than once by using different authentication information for the trigger signal, the request signal, and the response signal, and
the processor changes the authentication information to be used for each of the signals each time the process group is executed.

2. The control device according to claim 1,
wherein the processor changes the authentication information for each process group, the authentication information being included in each of the signals to be transmitted or received in the authentication process.

3. The control device according to claim 2,
wherein each of the signals uses different authentication information.

4. The control device according to claim 2,
wherein each of the signals uses same authentication information.

5. The control device according to claim 1, wherein
in the authentication process, the processor performs ranging authentication for measuring a distance between the communication device and the control device,
the trigger signal is a ranging trigger signal that notifies of start of the ranging authentication,
the request signal is a ranging request signal that requests a response to calculate the distance, and
the response signal is a ranging response signal that makes a response in a case where the ranging request signal is received.

6. The control device according to claim 1,
wherein the processor acquires a representative value of results of the authentication process repeated more than once in one process group, and performs final authentication on a basis of representative values related to the process group that is repeated more than once.

7. The control device according to claim 1, wherein
the control device in installed in a mobile object, and
the communication device is carried by a user of the mobile object.

8. The control device according to claim 7, comprising:
one or more communication sections configured to perform wireless communication with the communication device; and
the processor.

9. The control device according to claim 7,
wherein the control device
controls one or more mobile-object-mounted communication devices, each of which is installed in the mobile object and performs wireless communication with the communication device, and
controls transmission/reception of a signal to/from the communication device via the one or more mobile-object-mounted communication devices.

10. The control device according to claim 1, wherein
the communication device is installed in a mobile object, and
the control device is carried by a user of the mobile object.

11. The control device according to claim 10, wherein
the communication device includes
a plurality of communication sections configured to perform wireless communication with the control device, and
the processor, and
the control device transmits or receives signals to be used for the authentication process, to or from the plurality of communication sections.

12. A control method for execution by a processor, the control method comprising:
controlling an authentication process of performing a process related to device authentication together with at least one communication device on a basis of information included in a signal received through wireless communication with the communication device,
wherein authentication information is changed for each process group in which the authentication process is repeated more than once, the authentication information being information to be used for the authentication process,
the authentication information is encrypted information,
in a case where the processor is notified of execution of a process group in which the authentication process is repeated a designated number of times, the processor changes the authentication information in such a manner that the authentication information becomes different from the authentication information used for the process group executed before the notification,
signals transmitted or received in the authentication process include a trigger signal that notifies of a start of the authentication process, a request signal that is returned and requests a response in a case where the trigger signal is received, and a response signal that is returned and responds to the request in the case where the request signal is received,
the processor executes the process group in which the authentication process is repeated more than once by using different authentication information for the trigger signal, the request signal, and the response signal, and
the processor changes the authentication information to be used for each of the signals each time the process group is executed.

13. A control device, comprising:
a processor configured to control an authentication process of performing a process related to device authentication together with at least one communication device on a basis of information included in a signal received through wireless communication with the communication device,
wherein the processor performs the control in such a manner that authentication information is changed for each process group in which the authentication process is repeated more than once, the authentication information being information to be used for the authentication process,
the authentication information is encrypted information,
in a case where the processor is notified of execution of a process group in which the authentication process is repeated a designated number of times, the processor changes the authentication information in such a manner that the authentication information becomes different from the authentication information used for the process group executed before the notification,
signals transmitted or received in the authentication process include a trigger signal that notifies of a start of the authentication process, a request signal that is returned and requests a response in a case where the trigger signal is received, and a response signal that is returned and responds to the request in the case where the request signal is received,
the processor executes the process group in which the authentication process is repeated more than once by using the same authentication information for the trigger signal, the request signal, and the response signal, and
the processor changes the authentication information to be used for each of the signals, each time the process group is executed.

14. A control method for execution by a processor, the control method comprising:
controlling an authentication process of performing a process related to device authentication together with at least one communication device on a basis of information included in a signal received through wireless communication with the communication device,
wherein authentication information is changed for each process group in which the authentication process is repeated more than once, the authentication information being information to be used for the authentication process, the authentication information is encrypted information, in a case where the processor is notified of execution of a process group in which the authentication process is repeated a designated number of times, the processor changes the authentication information in such a manner that the authentication information becomes different from the authentication information used for the process group executed before the notification, signals transmitted or received in the authentication process include a trigger signal that notifies of a start of the authentication process, a request signal that is returned and requests a response in a case where the trigger signal is received, and a response signal that is returned and responds to the request in the case where the request signal is received, the processor executes the process group in which the authentication process is repeated more than once by using the same authentication information for the trigger signal, the request signal, and the response signal, and the processor changes the authentication information to be used for each of the signals, each time the process group is executed.

\* \* \* \* \*